US011354025B1

(12) United States Patent
Belgaonkar et al.

(10) Patent No.: US 11,354,025 B1
(45) Date of Patent: *Jun. 7, 2022

(54) ALTERNATE PRESENTATION TYPES FOR HUMAN WORKFLOW ACTIVITIES

(71) Applicant: Progress Software Corporation, Bedford, MA (US)

(72) Inventors: Sunil Belgaonkar, Lexington, MA (US); Shelley Chase, Hudson, NH (US)

(73) Assignee: Progress Software Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,200

(22) Filed: May 24, 2021

Related U.S. Application Data

(63) Continuation of application No. 16/277,854, filed on Feb. 15, 2019, now Pat. No. 11,042,273, which is a continuation of application No. 14/284,335, filed on May 21, 2014, now Pat. No. 10,228,826.

(60) Provisional application No. 61/825,741, filed on May 21, 2013.

(51) Int. Cl.
  *G06F 3/0484* (2022.01)
  *G06Q 10/06* (2012.01)
  *G06F 8/38* (2018.01)

(52) U.S. Cl.
  CPC .............. *G06F 3/0484* (2013.01); *G06F 8/38* (2013.01); *G06Q 10/06* (2013.01); *G06Q 10/06311* (2013.01)

(58) Field of Classification Search
  CPC .......... G06F 9/451; G06F 3/0484; G06F 8/38; G06Q 10/06311; G06Q 10/06
  See application file for complete search history.

(56) References Cited

U.S. PATENT DOCUMENTS

| | | |
|---|---|---|
| 7,246,319 B2 | 7/2007 | Alden et al. |
| 2004/0122853 A1 | 6/2004 | Moore |
| 2005/0138031 A1 | 6/2005 | Wefers |
| 2008/0040417 A1 | 2/2008 | Juncker |
| 2011/0040747 A1 | 2/2011 | Brad et al. |
| 2013/0205240 A1 | 8/2013 | Ling et al. |

*Primary Examiner* — Nicholas Ulrich
(74) *Attorney, Agent, or Firm* — Patent Law Works

(57) ABSTRACT

The disclosure includes a system and method for receiving a business process model for an application, the business process model including a human workstep, wherein input is received from a user to complete the human workstep; receiving a plurality of presentation types for association with the human workstep; receiving associated user interface (UI) metadata for the plurality of presentation types; and associating the human workstep with the plurality of presentation types and associated UI metadata.

20 Claims, 12 Drawing Sheets

900

```
<PerformingApp>
    <Metadata name="TARGETTYPE">JSP</Metadata>
    <Metadata name="TARGET">AUTO-GENERATED</Metadata>
</PerformingApp>
<PerformingApp>
    <Metadata name="TARGETTYPE">TABLET</Metadata>
    <Metadata name="TARGET"> HYPERLINK "http://progress.com/OEBPM/sample/pageForTablet.jsp" http://progress.com/OEBPM/sample/pageForTablet.jsp</Metadata>
</PerformingApp>
<PerformingApp>
    <Metadata name="TARGETTYPE">DOTNET</Metadata>
    <Metadata name="TARGET">./progress/OEBPM/sample/dontnet.cls</Metadata>
</PerformingApp>
<PerformingApp>
    <Metadata name="TARGETTYPE">MOBILE</Metadata>
    <Metadata name="TARGET"> HYPERLINK "http://progress.com/OEBPM/sample/pageForMobile.jsp" http://progress.com/OEBPM/sample/pageForMobile.jsp</Metadata>
</PerformingApp>
<PerformingApp>
    <Metadata name="TARGETTYPE">OTHERS</Metadata>
    <Metadata name="TARGET">customData</Metadata>
</PerformingApp>
```

Figure 9

ALTERNATE PRESENTATION TYPES FOR HUMAN WORKFLOW ACTIVITIES

CROSS REFERENCE TO RELATED APPLICATIONS

This application is a continuation of and claims priority to U.S. application Ser. No. 16/277,854, filed May 15, 2019, titled "Alternate Presentation Types for Human Workflow Activities," which claims priority to U.S. application Ser. No. 14/284,335, filed May 21, 2014, titled "Alternate Presentation Types for Human Workflow Activities," which claims priority to U.S. Provisional Patent Application No. 61/825,741, filed May 21, 2013, and titled "Method for Utilizing Alternate Presentation Types for Human Workflow Activities in a Business Process," the entireties of which are hereby incorporated by reference.

BACKGROUND

Business process software allows workflow tasks to be orchestrated by a business process management system to form a business process. The business process may include human workflow steps in the business process. Human workflow steps, occasionally referred to herein as "human worksteps," require input from human operators. Recently, there has been an increase in the variety of input devices and technologies available to users. A first problem with existing systems is that they fail to provide support for and consistent presentation of human worksteps on a variety of input devices. A second problem with existing systems is that they fail to allow a developer to select individual human worksteps to associate with specific user interface types to make those human worksteps available, or unavailable, on different types of input devices. A third problem with existing systems is that there is no compatibility with existing (e.g. legacy) applications that may rely on a business process that has already been implemented in an application.

SUMMARY

According to one innovative aspect of the subject matter described in this disclosure, a system comprises: a processor; and a memory, the memory storing instructions that when executed by the processor cause the system to: receive a business process model for an application, the business process model including a human workstep, wherein input is received from a user to complete the human workstep; receive a plurality of presentation types for association with the human workstep; receive associated user interface (UI) metadata for the plurality of presentation types; and associate the human workstep with the plurality of presentation types and associated UI metadata.

In general, another innovative aspect of the subject matter described in this disclosure may be embodied in methods that include receiving, using one or more processors, a business process model for an application, the business process model including a human workstep, wherein input is received from a user to complete the human workstep; receiving, using the one or more processors, a plurality of presentation types for association with the human workstep; receiving, using the one or more processors, associated user interface (UI) metadata for the plurality of presentation types; and associating, using the one or more processors, the human workstep with the plurality of presentation types and associated UI metadata.

Other aspects include corresponding methods, systems, apparatus, and computer program products. For instance, the operations further include receiving a request associated with the human workstep, the request including a requested presentation type, and responsive to receiving the request including a requested presentation type, sending UI metadata associated with the requested presentation type to a requesting device. For instance, the features further include the requesting device rendering a user interface responsive to receiving the UI metadata. For instance, the features further include that the business process model is that of a deployed existing application. For instance the features further include that the received business process model includes another human workstep, and the operations further include receiving another plurality of presentation types for association with the another human workstep; receiving associated user interface (UI) metadata for the another plurality of presentation types; and associating the another human workstep with the another plurality of presentation types and associated UI metadata. For instance, the operations further include associating the human workstep with a first group of one or more users; and associating the another human workstep with a second group of one or more users. For instance, the features further include that the first group and second group including at least one common user. For instance, the features further include that the first group and second group including no common user. For instance, the features further include the UI metadata includes one or more of a uniform resource identifier, a uniform resource locator, a tag and a file location. For instance, the features further include that a presentation type is more one or more of a tablet and a smartphone.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosure is illustrated by way of example, and not by way of limitation in the figures of the accompanying drawings in which like reference numerals are used to refer to similar elements.

FIG. 9 is an example of UI metadata tags and key value pairs according to one embodiment.

DETAILED DESCRIPTION

Figure 1:
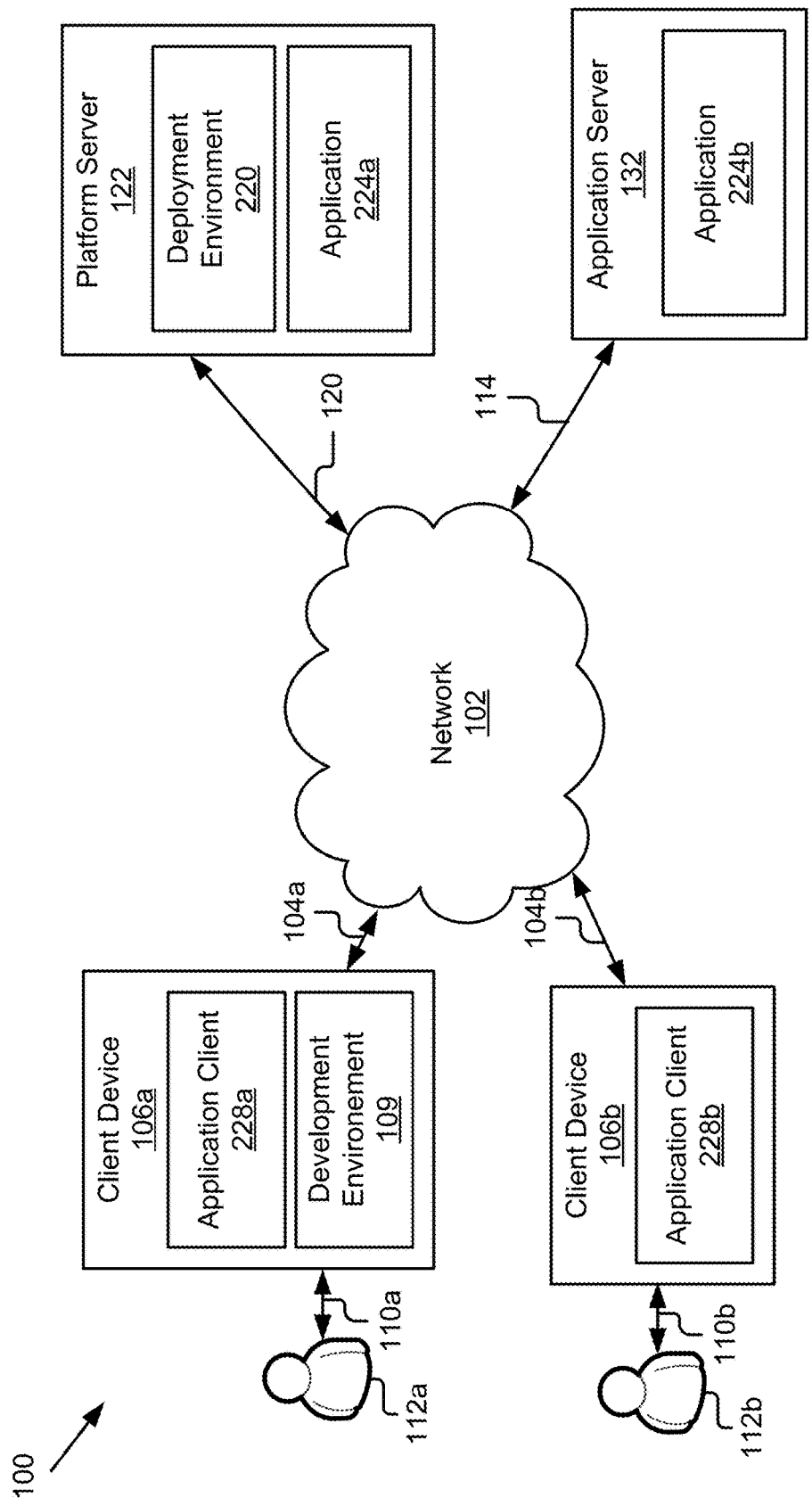
FIG. 1 is a block diagram illustrating an example system for providing user interfaces for a business process modeling environment according to one embodiment.

FIG. 1 is a block diagram illustrating an example system 100 for providing user interfaces for a business process modeling environment according to one embodiment. The illustrated system 100 includes client devices 106a and 106b, an application server 132 and a platform server 122, which are communicatively coupled via a network 102 for interaction with one another. For example, the client devices 106a and 106b (also referred to individually and collectively as 106) may be respectively coupled to the network 102 via signal lines 104a and 104b and may be accessed by users 112a and 112b (also referred to individually and collectively as 112) as illustrated by lines 110a and 110b. The application server 132 may be coupled to the network 102 via signal line 114. The platform server 122 may be coupled to the network 102 via signal line 120.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a, 106b may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two client devices 106 are depicted in FIG. 1, the system 100 may include any number of client devices 106. In addition, the client devices 106 may be the same or different types of computing devices.

In the depicted implementation, the client devices 106a, 106b respectively contain instances 228a, 228b of an application client (also referred to individually and collectively as application client 228). The application client 228 may be storable in a memory and executable by a processor of a client device 106. The application client is used to access the features and functionality of the application 224. In one embodiment, the application 224 is a Software as a Service (SaaS) application and the application client 228 is a portal that allows a user 112 via the client device 106 to access the features and functionality provided by the application 224. Examples of application clients 228 include, but are not limited to, portals, desktop clients, web browsers, smartphone applications, tablet applications, etc. In one embodiment, the application client requests a presentation type when interacting with the application 224.

In the depicted implementation, the client device 106a includes an instance of a development environment 109. The development environment 109 may be storable in a memory and executable by a processor of a client device 106. In one embodiment, the development environment 109 allows a user 112 of the client device 106 to develop applications 224. For example, a user 112 provides inputs to the client device 106, which are received by the development environment 109 and are used to define a business process and a user interface for an application 224. In one embodiment, an application developed using the development environment 109 may be a SaaS application. In one embodiment, the development environment 109 may be Progress Developer Studio for OpenEdge from Progress of Bedford, Mass. and use Advanced Business Language (ABL) and a version of Eclipse integrated development environment. It should be noted that, while FIG. 1 illustrates only client device 106a as including a development environment 109, any number of client devices 106 may include a development environment 109 for creating any number of applications to be deployed. In some embodiments, the client device 106 may also include applications for making phone calls, video calls, messaging, social networking, gaming, capturing digital video, and/or images, authoring documents, etc.

The users 112 are human users and occasionally referred to herein as "human operators" or similar. For clarity and convenience, the disclosure may refer to a user 112 by the specific role the user 112 is playing. For example, a user 112 interacting with the development environment 109 may occasionally be referred to as a "developer" and a user 112 interacting with the application client 228 may occasionally be referred to as an "end user." However, such a distinction may not always be made. Therefore, reference to a "user 112" or "user" may refer to a developer, an end user or both depending on the context.

The platform server 122 may include one or more computing devices having data processing, storing, and communication capabilities. For example, the platform server 122 may include one or more hardware servers, server arrays, storage devices, systems, etc., and/or may be centralized or distributed/cloud-based. In some implementations, the platform server 122 may include one or more virtual servers, which operate in a host server environment and access the physical hardware of the host server including, for example, a processor, memory, storage, network interfaces, etc., via an abstraction layer (e.g., a virtual machine manager). In one embodiment, the platform server 122 includes a deployment environment 220. In one embodiment, the platform server 122 is a server that offers a Platform as a Service (PaaS). For example, in one embodiment, the platform server 122 server that runs OpenEdge by Progress of Bedford, Mass.

The deployment environment 220 receives the application developed using the development environment 109 and deploys the application 224. For example, a developer provides inputs to the development environment 109 to define a business process, user interfaces and other desired features and functionality to the development environment 109 and the deployment environment 220 receives resulting code and deploys a working application 224. In one embodiment, the deployment environment 220 deploys the application 224a to the platform server 122. For example, the deployment environment 220 deploys the application to a server run by the same entity that runs the PaaS. In one embodiment, the deployment environment 220 deploys the application 224b to an application server 132. For example, the deployment environment 220 deploys the application 224 to a server maintained by an entity associated with the developer.

The application server 132 may include one or more computing devices having data processing, storing, and communication capabilities. For example, the intermediary server 132 may include one or more hardware servers, server arrays, storage devices, systems, etc., and/or may be centralized or distributed/cloud-based. In some implementations, the application server 132 may include one or more virtual servers, which operate in a host server environment and access the physical hardware of the host server including, for example, a processor, memory, storage, network interfaces, etc., via an abstraction layer (e.g., a virtual machine manager). In one embodiment, the application server 132 includes an application 224b.

It should be understood that the system 100 illustrated in FIG. 1 is representative of an example system for providing user interfaces for a business process modeling environment according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
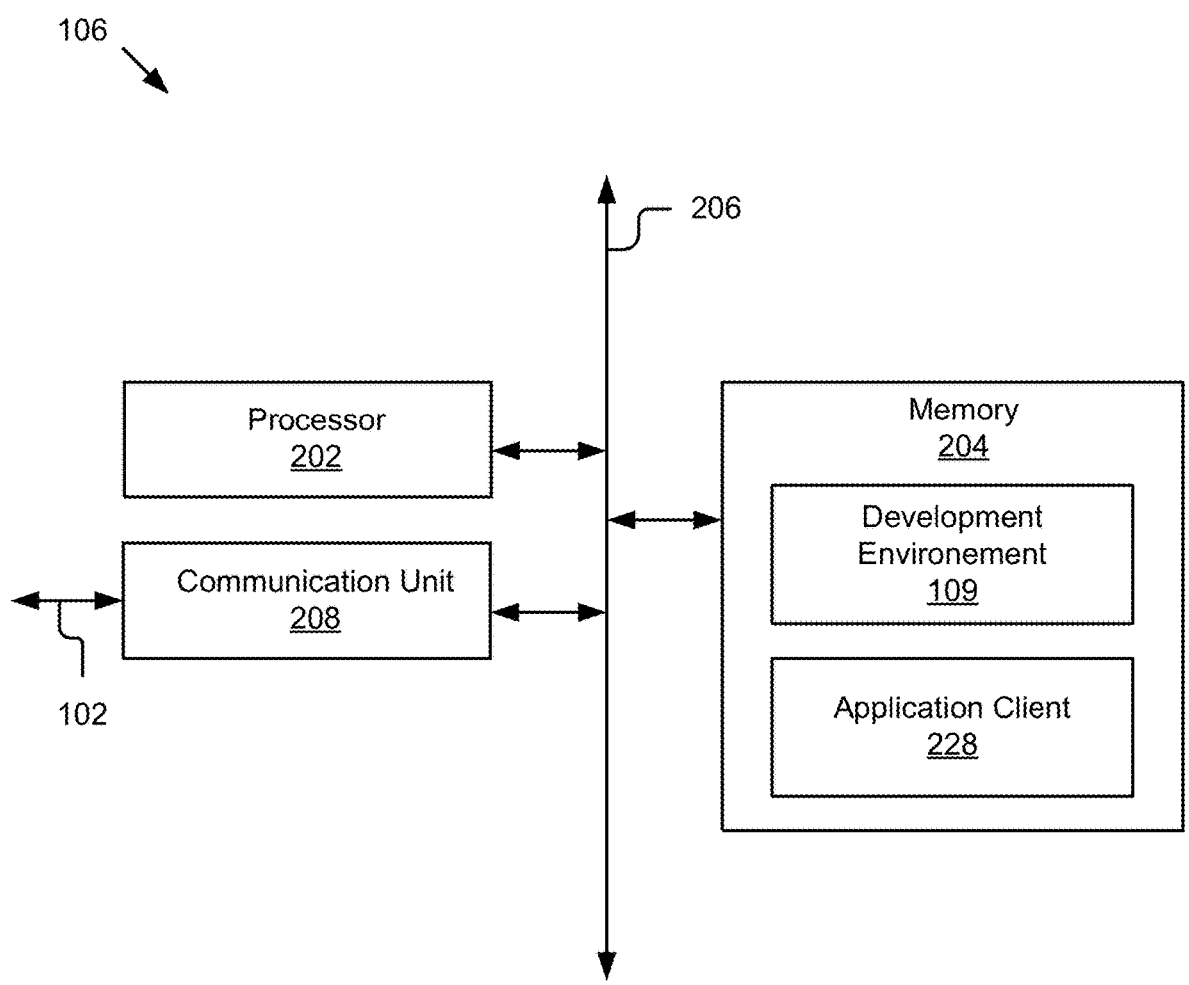
FIG. 2 is a block diagram illustrating an example client device according to one embodiment.

FIG. 2 is a block diagram of a client device 106 according to one embodiment. The client device 106, as illustrated, may include a processor 202, a memory 204 and a communication unit 208, which may be communicatively coupled by a communications bus 206. The client device 106 depicted in FIG. 2 is provided by way of example and it should be understood that it may take other forms and include additional or fewer components without departing from the scope of the present disclosure. For example, while not shown, the client device 106 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in a system 100 with various modifications, including, for example, the application server 132 (e.g. by omitting the development environment 109 and application client 228 and including a deployment environment 220 and an application 224a) and a application server 132 (e.g. by omitting the development environment 109 and application client 228 and including an application 224b).

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the client device 106 including, for example, the memory 204 and communication unit 208.

The memory 204 may store and provide access to data to the other components of the client device 106. In some implementations, the memory 204 may store instructions and/or data that may be executed by the processor 202. For example, as depicted, the memory 204 may store the development environment 109 and application client 228 according to one embodiment. The memory 204 is also capable of storing other instructions and data, including, for example, an operating system, hardware drivers, other software applications, databases, etc. The memory 204 may be coupled to the bus 206 for communication with the processor 202 and the other components of the client device 106.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a client device 106 or between computing devices 106/132/122, a network bus system including the network 102 or portions thereof, a processor mesh, a combination thereof, etc. In some implementations, the development environment 109, its subcomponents 324, 326, 328, 330, 422, 424, 426, 428 and various other software operating on the client device 106 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

In some embodiments, a storage device (not shown) may also be included. A storage device is an information source for storing and providing access to data. In some implementations, the storage device may be coupled to the components 202, 204, and 208 of the computing device 106 via the bus 206 to receive and provide access to data. The storage device (not shown) can include one or more non-transitory computer-readable mediums for storing the data. In some implementations, the storage device may be incorporated with the memory 204 or may be distinct therefrom.

As mentioned above, the client device 106 may include other and/or fewer components. Examples of other components may include a display, an input device, a sensor, etc. (not shown). In one embodiment, the client device 106 includes a display. The display may display electronic images and data for presentation to a user 112 including a user interface (UI) as discussed below. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the client device 106. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Development Environment 109

Figure 3:
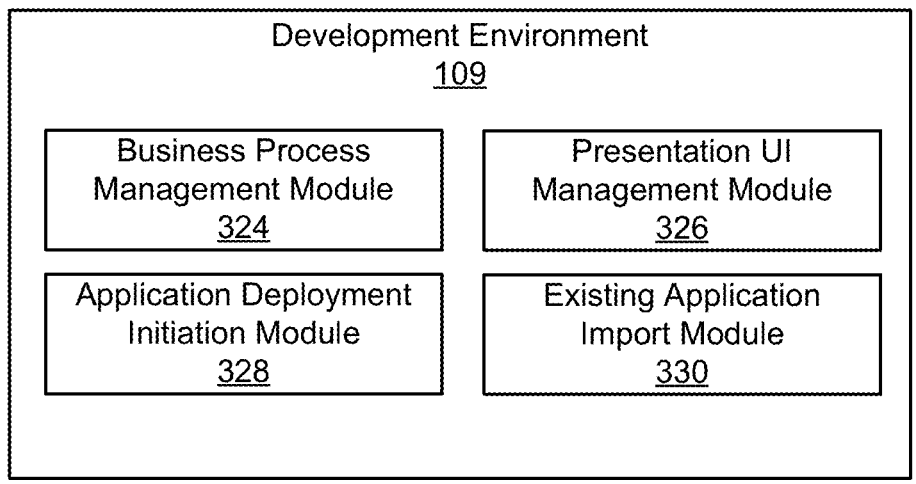
FIG. 3 is a block diagram of a development environment according to one embodiment.

Referring now to FIG. 3, an example of the development environment 109 is shown in more detail according to one embodiment. FIG. 3 is a block diagram of the development environment 109 included in a client device 106 according to one embodiment.

The development environment 109 is used by a user 112 of the client device 106 to develop applications 224. For example, a developer (i.e. a user 112) provides inputs to the client device 106, which are received by the development environment 109 and are used to define features and functionality of an application 224. In one embodiment, an application developed using the development environment 109 may be a SaaS application. In one embodiment, the development environment 109 comprises a business process management module 324, a presentation user interface (UI) management module 326, an application deployment module 328 and an existing application import module 330.

The business process management module 324 includes code and routines for managing a business process, occasionally referred to herein as a "business process model." In one embodiment, the business process management module 324 is a set of instructions executable by the processor 202. In another embodiment, the business process management module 324 is stored in the memory 204 and is accessible and executable by the processor 202. In either embodiment, the business process management module 324 is adapted for cooperation and communication with the processor 202, other components of the client device 106 and other components of the development environment 109.

The business process management module 324 manages a business process. In one embodiment, the business process management module 324 manages a business process creating, modifying and deleting a business process or components thereof based on input received from a developer via the client device 106. For example, the business process management module 324 links worksteps to create a workflow that defines a business process. The worksteps may be automated or human worksteps. Automated worksteps do not require human intervention. For example, an automated work step may be for the application 224 to automatically take a first action when a threshold condition is satisfied and to take a second action when the threshold condition is not satisfied. Human worksteps require input from a human user. For example, human workstep may be for a user to approve or deny an action. Examples of human worksteps may include, but are not limited to, data entry, approval actions, escalation actions and other inputs that cannot be, or are chosen not to be, automated.

Figure 8:
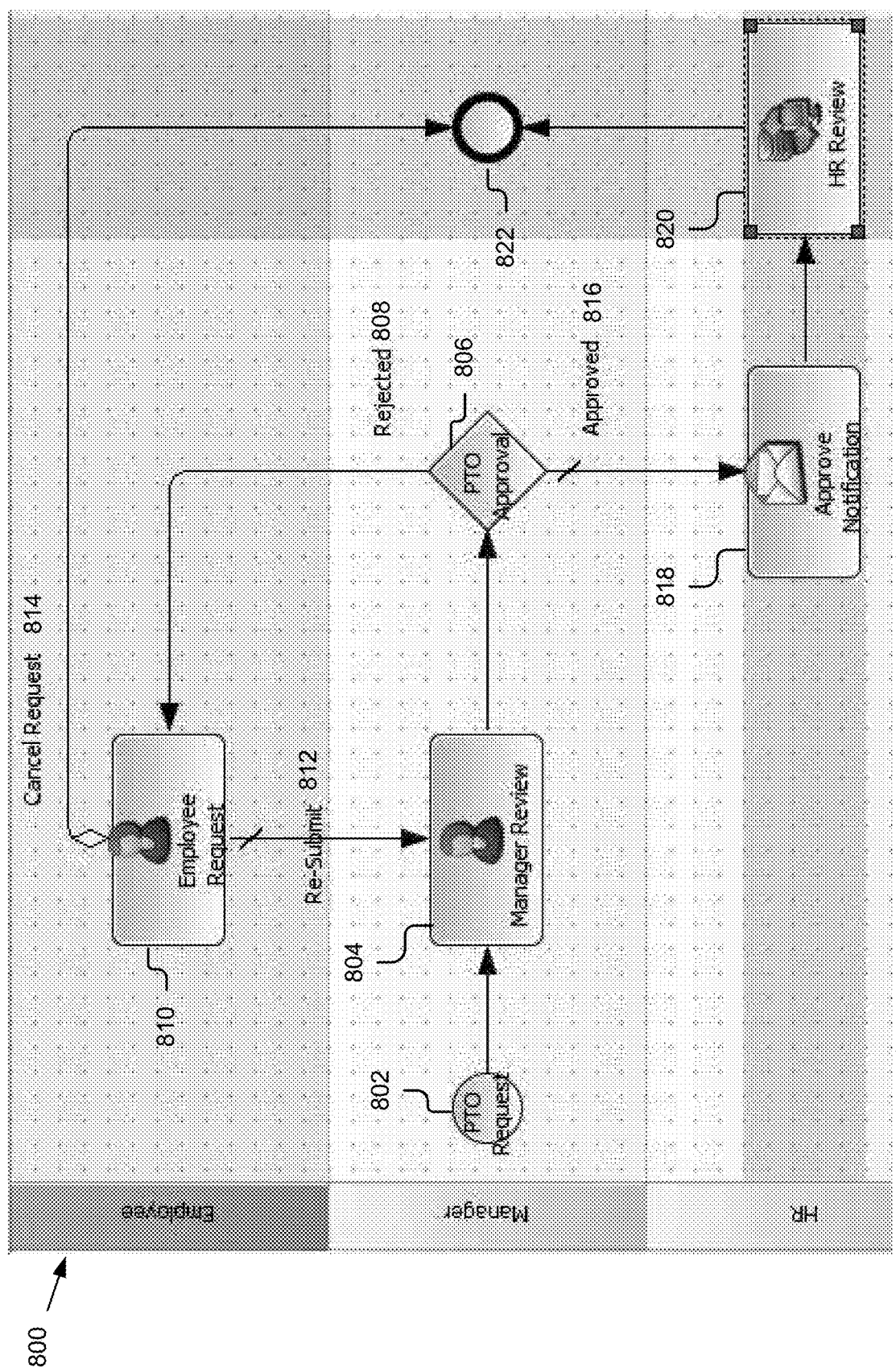
FIG. 8 is an example of a graphical representation of a business process according to one embodiment.

In one embodiment, business process management module 324 allows a developer to graphically manage a business process. For example, referring now to FIG. 8, an example of a graphical representation of a business process is illustrated according to one embodiment. The business process 800 of FIG. 8 is for handling employee requests for paid time off (PTO). The business process 800 starts at graphic 802. At graphic 802, the manager receives a PTO request. At graphic 804, the manager reviews the PTO request and provides input to approve or reject the PTO. At graphic 806, a determination is made as to whether the PTO is approved 816 or rejected 808.

When the PTO request is rejected 808, at graphic 810, the employee may provide input to resubmit 812 the PTO request or cancel 814 the PTO request. When, at graphic 810, the employee provides input to cancel 814 the request, the process 800 ends. When, at graphic 810, the employee provides input to resubmit 812 the request, the process 800 returns to graphic 804. The portion of the process 800 represented by 804, 806, 808 and 812 may be repeated until either the employee, at graphic 810, provides input cancelling 814 the PTO request or the manager provides input at graphic 804 indicating approval 816 of the PTO at graphic 806. When the PTO request is approved 816, human resources (HR) sends an approval notification to the employee at graphic 818 and review, at graphic 820, before the process ends 822.

In one embodiment, the business process management module 324 creates business processes (e.g. similar to that illustrated in FIG. 8) by dragging and dropping graphics representing the worksteps and graphically connecting the worksteps. For clarity and convenience the PTO example of FIG. 8 may be occasionally referred to herein. It should be recognized that the business process of FIG. 8 is merely an example provided for clarity and convenience and that other business processes may be created, modified, modeled and managed by the business process management module 324 in order to represent other business processes.

Referring again to FIG. 3, in one embodiment, the business process management module 324 passes a business process to one or more of the presentation UI management module 326 and the application deployment initiation module 328. In one embodiment, the business process management module 324 stores the business process in the memory 204 (or any other non-transitory storage medium communicatively accessible, e.g., a storage device). The other modules of the development environment 109 including, e.g., the presentation UI management module 326 or the application deployment initiation module 328, can retrieve the business process by accessing the memory 204 (or other non-transitory storage medium).

The presentation UI management module 326 includes code and routines for associating one or more presentation types with one or more human worksteps of a business process. In one embodiment, the presentation UI management module 326 is a set of instructions executable by the processor 202. In another embodiment, the presentation UI management module 326 is stored in the memory 204 and is accessible and executable by the processor 202. In either embodiment, the presentation UI management module 326 is adapted for cooperation and communication with the processor 202, other components of the client device 106 and other components of the development environment 109.

The presentation UI management module 326 associates one or more presentation types with one or more human worksteps of a business process. The presentation UI management module 326 may provide one or more benefits by associating a presentation type with a human workstep. In one embodiment, the presentation UI management module 326 beneficially determines which user or group of users may perform which human worksteps and the type(s) of client device(s) 106 those users may utilize to access and complete the human worksteps. An example of a presentation UI management module 326 according to one embodiment is discussed below with reference to FIG. 4.

In one embodiment, the presentation UI management module 326 passes the one or more associated presentation types including UI metadata, discussed below, to the application deployment initiation module 328. For example, the presentation UI management module 326 is communicatively coupled to the application deployment initiation module 328 to send the one or more associated presentation types to the application deployment initiation module 328. In another embodiment, the presentation UI management module 326 stores the associated presentation types including UI metadata in memory 204 (or any other non-transitory storage medium communicatively accessible (e.g. storage device)), and the application deployment initiation module 328 may retrieve the one or more associated presentation types by accessing the memory 204 (or other non-transitory storage medium).

The application deployment initiation module 328 includes code and routines for initiating the deployment of an application developed in the development environment 109. In one embodiment, the application deployment initiation module 328 is a set of instructions executable by the processor 202. In another embodiment, the application deployment initiation module 328 is stored in the memory 204 and is accessible and executable by the processor 202. In either embodiment, the application deployment initiation module 328 is adapted for cooperation and communication with the processor 202, other components of the client device 106 and other components of the development environment 109.

The application deployment initiation module 328 initiates the deployment of an application developed in the development environment 109. In one embodiment, the application deployment initiation module 328 initiates deployment responsive to a deployment request from the developer. For example, assume a developer has created a business process, or modified an imported business process, using the business management module 324, and associated the desired presentation types and associated metadata with the human worksteps of that business process. In one embodiment, the developer inputs that he/she desires that the business process and presentation types be deployed in an application and the application deployment initiation module 328 receives that deployment request and send deployment information including the business process and the presentation types associated metadata to the deployment environment 220 for deployment as a deployed application 224.

Upon deployment, the application 224 operates as defined by the business process and presentation types their associated metadata. For example, in one embodiment, the example business process 800 of FIG. 8 upon deployment would receive a PTO request from a user 802 receive input from a manager 804 and determine 806 whether the manager's input approved 816 or rejected 808 the PTO request and so forth, and, assuming the human worksteps 802, 804 and 810 are associated with ".Net" and "Mobile" presentation types, the employee and manager may each provide input using a mobile device (e.g. a smartphone, PDA, tablet, etc.) or a desktop computer as a client device 106.

In one embodiment, the application deployment initiation module 328 passes the deployment information to the deployment environment 220. For example, the application deployment initiation module 328 is communicatively coupled to the deployment environment 220 to send the deployment information to the deployment environment 220. In another embodiment, the application deployment initiation module 328 stores the deployment information in memory 204 (or any other non-transitory storage medium communicatively accessible (e.g. storage device)), and the deployment environment 220 may retrieve the deployment information by accessing the memory 204 (or other non-transitory storage medium).

The existing application import module 330 includes code and routines for importing a business process of a deployed application 224 into the development environment 109. In one embodiment, the existing application import module 330 is a set of instructions executable by the processor 202. In another embodiment, the existing application import module 330 is stored in the memory 204 and is accessible and executable by the processor 202. In either embodiment, the existing application import module 330 is adapted for cooperation and communication with the processor 202, other components of the client device 106 and other components of the development environment 109.

The existing application import module 330 imports a business process of a deployed application 224 into the development environment 109. For example, the existing application import module 330 imports a legacy application into the development environment 109. In one embodiment, the existing application import module 330 imports the business process of a deployed application 224 so that a developer may modify the process using the business process management module 324, for example, to modify the workflow to include an additional workstep or modify an existing workstep (e.g. to comply with a new regulation or business practice). In one embodiment, the existing application import module 330 imports the business process of a deployed application 224 so that one or more types of presentation UIs may be associated with one or more human worksteps of the imported business process. For example, the existing application import module 330 imports the business process of a deployed application so that a mobile user interface type user interface may be associated with a human workstep and thereby allow an end user to provide the input necessary to complete that human workstep using a mobile device. The existing application import module 330 beneficially allows an application 224 to be updated to represent changes in a business process and as new client devices 106, or types thereof, are developed, thereby increasing the usable life of an application 224 using the business process and the accessibility of the application 224 using a variety of client devices 106 when desired.

The existing application import module 330 passes an imported business process to one or more of business process management module 324 and the presentation UI management module 326. For example, the existing application import module 330 is communicatively coupled to one or more of business process management module 324 and the presentation UI management module 326 to send the imported business process to one or more of business process management module 324 and the presentation UI management module 326. In another embodiment, the existing application import module 330 stores the imported business process in memory 204 (or any other non-transitory storage medium communicatively accessible (e.g. storage device)), and one or more of business process management module 324 and the presentation UI management module 326 may retrieve the imported business process by accessing the memory 204 (or other non-transitory storage medium).

Example UI Presentation Management Module 326

Figure 4:
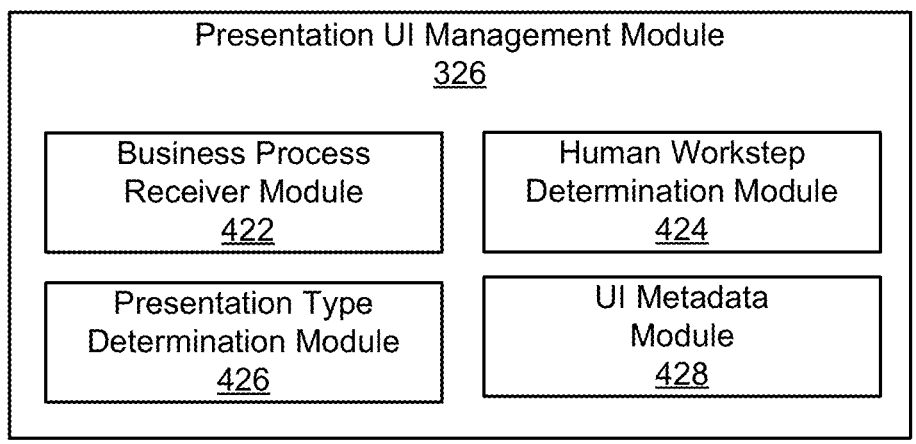
FIG. 4 is a block diagram of a presentation user interface (UI) management module according to one embodiment.

Referring now to FIG. 4, the presentation UI management module 326 is shown in more detail according to one embodiment. FIG. 4 is a block diagram of the presentation UI management module 326 included in a client device 106 according to one embodiment.

In one embodiment, the presentation UI management module 326 determines which user or group of users may perform which human worksteps and the type(s) of client device(s) 106 those users may utilize to access and complete the human worksteps. In one embodiment, the presentation UI management module 326 comprises a business process receiver module 422, a human workstep determination module 424, a presentation type determination module 426 and UI metadata module 428.

The business process receiver module 422 includes code and routines for receiving a business process including at least one human workstep. In one embodiment, the business process receiver module 422 is a set of instructions executable by the processor 202. In another embodiment, the business process receiver module 422 is stored in the memory 204 and is accessible and executable by the processor 202. In either embodiment, the business process receiver module 422 is adapted for cooperation and communication with the processor 202, other components of the client device 106 and other components of the presentation UI management module 326.

The business process receiver module 422 receives a business process including at least one human workstep. Depending on the embodiment and circumstances, the business process receiver module 422 may receive the business process from the business process management module 324 (e.g. when the business process is newly created or is a modified business process from an existing application 224) or the existing application import module 330 (e.g. when a developer is associating new presentation types with the human workstep(s) of a legacy application 224 without modifying the business process used by the legacy application 224).

In one embodiment, the business process receiver module 422 passes the received business process to the human workstep determination module 424. In one embodiment, the business process receiver module 422 stores the received business process in the memory 204 (or any other non-transitory storage medium communicatively accessible, e.g., a storage device). The other modules of the presentation UI management module 326 including, e.g., the human workstep determination module 424, can retrieve the received business process by accessing the memory 204 (or other non-transitory storage medium).

The human workstep determination module 424 includes code and routines for determining a human workstep to be associated with one or more presentation types. In one embodiment, the human workstep determination module 424 is a set of instructions executable by the processor 202. In another embodiment, the human workstep determination module 424 is stored in the memory 204 and is accessible and executable by the processor 202. In either embodiment, the human workstep determination module 424 is adapted for cooperation and communication with the processor 202, other components of the client device 106 and other components of the presentation UI management module 326.

The human workstep determination module 424 determines a human workstep for association with one or more presentation types. In one embodiment, the human workstep determination module 424 determines a human workstep responsive to selection of the human workstep by the developer. For example, a developer selects the manager review 804 human workstep of business process 800 in FIG. 8 and the human workstep determination module 424 receives that selection and determines that human workstep 804 is to be associated with one or more presentation types.

In one embodiment, the human workstep determination module 424 allows each human workstep of a business process may be individually for association with its own, potentially unique, set of presentation types. Such an embodiment, provides the developer with granular control over what presentation type(s) are associated with which human workstep(s). In one embodiment, the human workstep determination module 424 allows multiple human worksteps to be simultaneously determined. For example, assume a developer wants to associate a common set of presentation types with multiple human worksteps; in one embodiment, the developer may select the multiple human worksteps and the human workstep determination module 424 determines the human worksteps for association with a presentation type are those selected.

In one embodiment, the human workstep determination module 424 determines a human workstep automatically. For example, when a business process is created or imported, the human workstep determination module 424 automatically determines the human worksteps in the business process if any.

In one embodiment, the human workstep determination module 424 passes the determined human work step(s) to the presentation type determination module 426. In one embodiment, the human workstep determination module 424 stores the determined human work step(s) in the memory 204 (or any other non-transitory storage medium communicatively accessible, e.g., a storage device). The other modules of the presentation UI management module 326 including, e.g., the presentation type determination module 426, can retrieve the determined human work step(s) by accessing the memory 204 (or other non-transitory storage medium).

The presentation type determination module 426 includes code and routines for determining one or more presentation types for a human workstep. In one embodiment, the presentation type determination module 426 is a set of instructions executable by the processor 202. In another embodiment, the presentation type determination module 426 is stored in the memory 204 and is accessible and executable by the processor 202. In either embodiment, the presentation type determination module 426 is adapted for cooperation and communication with the processor 202, other components of the client device 106 and other components of the presentation UI management module 326.

The presentation type determination module 426 determines one or more presentation types for a human workstep. In one embodiment, the presentation type determination module 426 determines one or more presentation types for each of the human worksteps determined by the human workstep determination module 424.

The presentation types available for association with a human workstep may vary depending on the embodiment. In one embodiment, the presentation types include Java Server Pages (JSP), .Net, Mobile, Tablet and Other. However, it should be recognized that other types of presentations exist and may be associated with a human workstep including but not limited to classic GUI, character user interface, Web Speed, command line, portal, form, etc. It should also be recognized that presentation types may be defined differently. For example, while the aforementioned embodiment defines Mobile and Tablet as separate presentation types, in one embodiment, a single Mobile & Tablet presentation type may be used. In another example, the Tablet presentation type may be divided into separate presentation types based on tablet operating system, e.g., a presentation type for Apple iOS, a presentation type for Google's Android OS and a presentation type for Amazon's Fire OS.

In one embodiment, associating a presentation type may allow a client device 106 that supports that presentation type to present a user interface when it otherwise would not have been able to present a UI properly or at all. For example, assume the application 224 is a legacy application which is intended to be accessed using an application client 228 that is a desktop client on a client device 106 that is a desktop computer running Windows; in one embodiment, the presentation UI management module 326 may associate a mobile presentation type to enable a smartphone to present a UI of the application 224 when the application 224 is redeployed.

In one embodiment, a developer may control which client devices 106 may be used to access and complete which worksteps based on the presentation type(s) the developer associates with the human workstep. For example, while many client devices 106 may support a simple Yes/No approval step, some human worksteps may require presenting and/or receiving complex data in order for the end user to complete the human workstep; in one embodiment, the developer may choose to associate human worksteps that require presenting and/or receiving complex data to be limited to client devices 106 that are typically associated with a larger screen and/or keyboard. For example, the developer may choose to associate such a human workstep with a .Net presentation type as .net is typically associated with desktop computing devices.

In one embodiment, a human workstep is associated with an end user or group of end users authorized to access and perform the human workstep. In one embodiment, the presentation type determination module 426 allows a developer to further refine permissions by associating presentation types to different users performing the same workstep. For example, the developer may determine a first presentation type is available to a first group of users (e.g. customer service representatives) and a second presentation type, in addition to or instead of the first presentation type depending on the embodiment, is available to a second set of users (e.g. senior customer service representatives or a group of executives) for the same human workstep. Depending on the embodiment, the different use groups may overlap (e.g. the senior customer service reps are a subset of the customer service reps and the first and second group of users share at least one common user) or be mutually exclusive (e.g. the executives do not include a sales rep and the first and second group of users share no common user).

In one embodiment, a human workstep is associated with at least one presentation type by default. For example, in one embodiment, a human workstep is automatically associated with a JSP presentation type by default and other presentation types must be associated with a human workstep based on explicit input received from a developer. Depending on the embodiment, a default presentation type may or may not be unassociated with a human workstep.

In one embodiment, the presentation type determination module 426 passes the one or more presentation types associated with the determined workstep(s) to the UI metadata module 428. In one embodiment, the presentation type determination module 426 stores the one or more presentation types associated with the determined workstep(s) in the memory 204 (or any other non-transitory storage medium communicatively accessible, e.g., a storage device). The other modules of the presentation UI management module 326 including, e.g., the UI metadata module 428, can retrieve the one or more presentation types associated with the determined workstep(s) by accessing the memory 204 (or other non-transitory storage medium).

The UI metadata module 428 includes code and routines for obtaining metadata for a presentation type and associating the presentation type and associated metadata with a human workstep. In one embodiment, the UI metadata module 428 is a set of instructions executable by the processor 202. In another embodiment, the UI metadata module 428 is stored in the memory 204 and is accessible and executable by the processor 202. In either embodiment, the UI metadata module 428 is adapted for cooperation and communication with the processor 202, other components of the client device 106 and other components of the presentation UI management module 326.

In one embodiment, when a default presentation type is associated with a human workstep, the developer need not provide UI metadata for that human workstep. For example, assume a "Form" or "Portal" presentation type that uses Java Server Pages (JSP); in one embodiment, the developer need not provide the .jsp files since the necessary files are automatically provided by the development environment 109.

In one embodiment, when a default presentation type is not associated with a human workstep or a non-default presentation type is associated with a human workstep a developer provides logic for completing the human workstep and UI metadata for obtaining the artifacts for rendering a UI for that presentation type. Examples of UI metadata include but are not limited to a tag, a Uniform Resource Identifier (URI), a Uniform Resource Locator (URL), file path/location, etc.

For example, assume a ".net" presentation type is associated with a human workstep; in one embodiment, the UI metadata module 428 receives metadata from the developer in the form of a file location of the .cls file or .p code that builds the .net UI for that human workstep. In another example, assume that a human workstep is associated with a "Mobile & Tablet," a "Web Speed" and an "Other" presentation type; in one embodiment, the UI metadata module 428 obtains an HTML URL of a website that hosts the UI for the "Mobile & Tablet" presentation type, URL for the "Web Speed" presentation type, and custom data and/or a URL of a webserver that hosts the UI for the "Other" presentation type.

In one embodiment, the UI metadata obtained by the UI metadata module 428 is stored using tags and key value pairs. For example, referring to FIG. 9 and example of UI metadata tags and key value pairs are shown according to one embodiment. In the illustrated embodiment, the tags 900 for multiple presentation types associate with a human workstep are shown. In the illustrated embodiment, the tags include a presentation type (i.e. "TARGETTYPE") and the metadata obtained for the presentation type (i.e. "TARGET") and form a key value pair. For example, the "DOT-NET" and file location of the .cls file are a key value pair in the tags 900 of FIG. 900.

Figure 10:
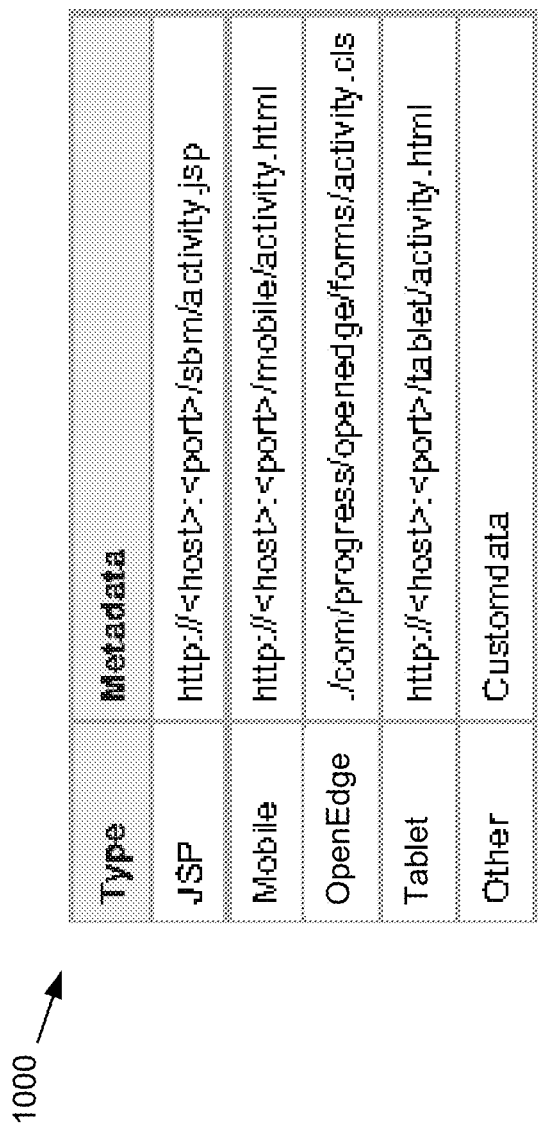
FIG. 10 is an example hash table of the presentation types and associated UI metadata for a human workstep according to one embodiment.

In one embodiment, the UI metadata module 428 generates a hash table for each human workstep in the business process. For example, FIG. 10 is an example hash table of the presentation types and associated UI metadata for a human workstep according to one embodiment. In the illustrated embodiment, the human workstep is associated with five presentation types and each of the presentation types is associated with UI metadata. For example, the hash table 1000 illustrates that the JSP, Mobile and Tablet presentation types are each associated with a URL, the OpenEdge presentation type is associated with a file location and the Other presentation type is associated with Custom-data.

In one embodiment, the UI metadata module 428 passes the UI metadata to the application deployment initiation module 328. In one embodiment, the UI metadata module 428 stores the UI metadata in the memory 204 (or any other non-transitory storage medium communicatively accessible, e.g., a storage device). The other modules of the development environment 109 including, e.g., the application deployment initiation module 328, can retrieve the UI metadata by accessing the memory 204 (or other non-transitory storage medium).

In one embodiment, when an end user utilizes an application client 228 to access the application 224, the application client 228 provides the application a user identifier and a requested presentation type. For example, the application client 228 provides the application 224 the end user's username, which is used to identify which human worksteps the user is authorized to act upon, and a requested presentation type, which may be indicative of a type of client device 106 the end user is using (e.g. a "Mobile" presentation type may indicate the end user is using a mobile phone). In one embodiment, the requested presentation type is used by the application 224 to determine which of the worksteps the user is authorized to act upon the user may act upon using the present client device 106 and presents those human worksteps to the end user. In one embodiment, when an end user selects a human workstep, occassionally also referred to as a "task," to complete, the application sends the UI metadata associated with the requested presentation type for that human workstep and the client device 106 renders the UI(s). In one embodiment, neither the application 224 nor its server 122/132 is responsible for validating or rendering the user interface.

Example Methods

Figure 5:
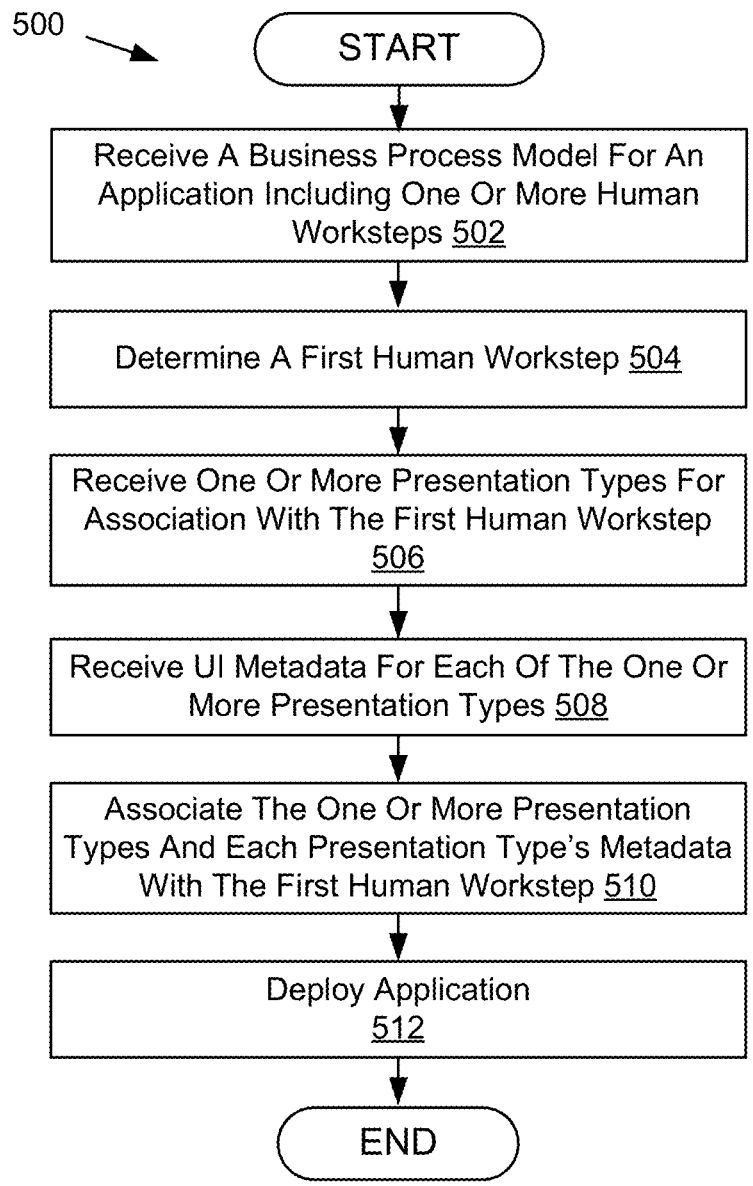
FIG. 5 is a flowchart of an example method for providing user interfaces for a business process modeling environment during application development according to one embodiment.

FIG. 5 depicts method 500 performed by the system described above in reference to FIGS. 1-4 for providing user interfaces for a business process modeling environment during application development. The method 500 begins at block 502. At block 502, the business process receiver module 422 receives a business process model for an application 224 including one or more human worksteps. At block 504, the human workstep determination module 424 determines a first human workstep. At block 506, the presentation type management module 426 receives one or more presentation types for association with the first human workstep. At block 508, the UI metadata module 428 receives UI metadata for each of the one or more presentation types for association with the first human workstep. At block 510, the UI metadata module 428 associates the one or more presentation types and each presentation type's metadata with the first human workstep. At block 512, the application deployment initiation module 328 sends the application 224 for deployment by the deployment environment 220. It should be recognized that while the method 500 only discusses a first human workstep, the disclosure herein is not limited to a single human workstep. For example, a method in which blocks similar to 504, 506, 508 and 510 are repeated for additional human worksteps in the business process model received at block 502 is contemplated and within the scope of this disclosure.

Figure 6:
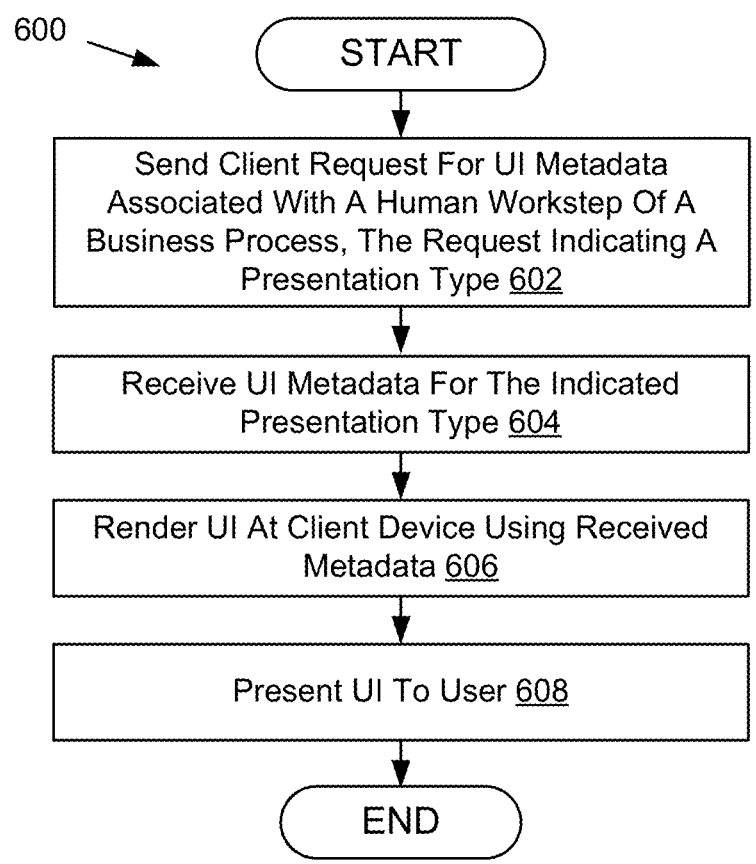
FIG. 6 is a flowchart of an example method for a computing device to provide user interfaces for a business process modeling environment at runtime according to one embodiment.

FIG. 6 depicts method 600 performed by the client device 106 described above in reference to FIGS. 1-4 for providing user interfaces for a business process modeling environment at the application's 224 runtime. The method 600 begins at block 602. At block 602, the application client 228 of the client device 106 sends a client request for UI metadata associated with a human workstep of a business process, the client request indicating a presentation type. At block 604, the application client 228 receives UI metadata for the indicated presentation type. At block 606, the client device 106 renders a UI using the received metadata and presents, at block 608, the UI to the user 112.

Figure 7:
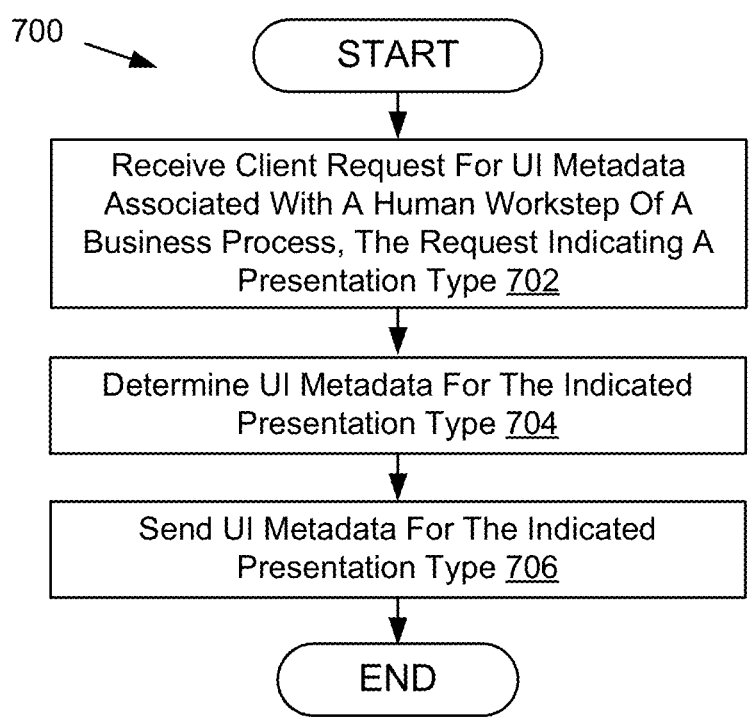
FIG. 7 is a flowchart of an example method for an application to provide user interfaces for a business process modeling environment at runtime according to one embodiment.

FIG. 7 depicts method 700 performed by the application 224 for providing user interfaces for a business process modeling environment at the application's 224 runtime according to one embodiment. The method 700 begins at block 702. At block 702, the application 224 receives a client request for UI metadata associated with a human workstep of a business process, the request indicating a presentation type. At block 704, the application 224 determines the UI metadata for the indicated presentation type and sends, at block 706, the UI metadata for the indicated presentation type to the client device 106.

Example User Interfaces

Figure 11A:
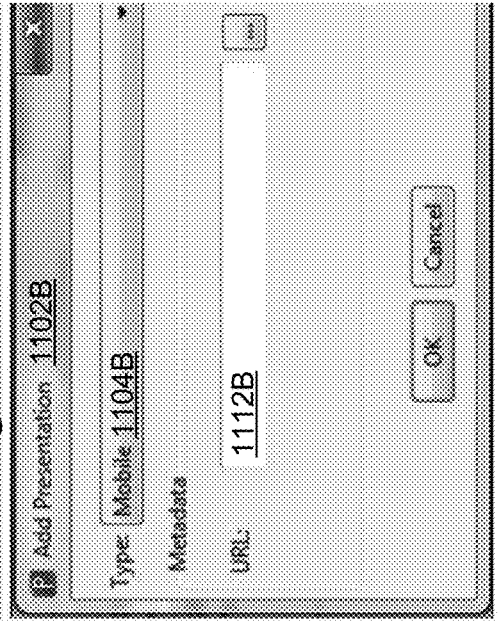
FIG. 11A-D are example graphical user interfaces (GUIs) for receiving a presentation type and UI metadata from a developer according to one embodiment.
Figure 11B:
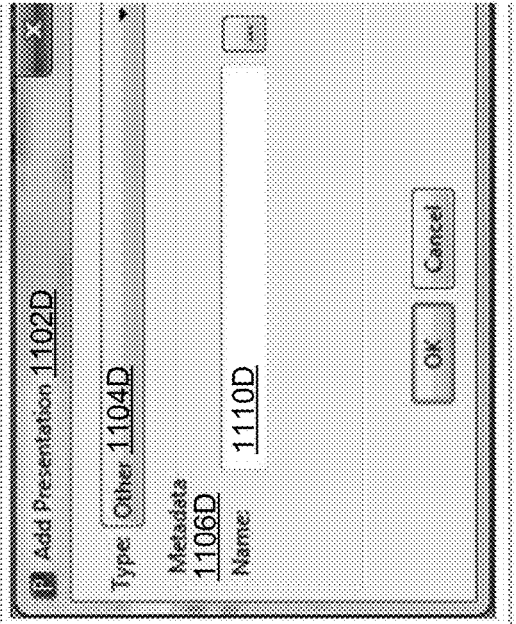
Figure 11C:
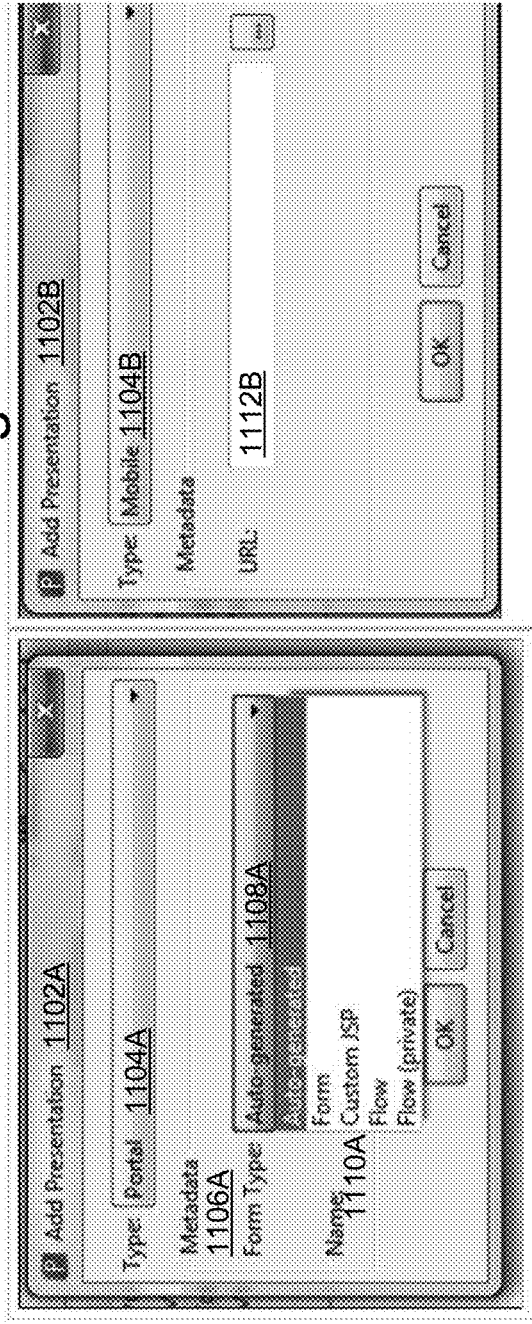
Figure 11D:
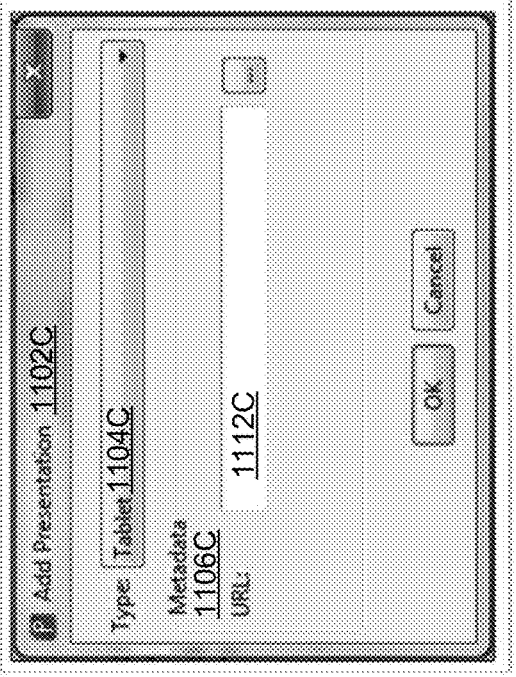

FIGS. 11A-D are example graphical user interfaces (GUIs) for receiving a presentation type and UI metadata from a developer according to one embodiment. FIGS. 11A-D include a UI 1102 with a pull-down menu 1104 for selecting a presentation type to associate with a human workstep and a section 1106 to receive user input defining UI metadata. FIGS. 11A-D illustrate that the metadata section 1106 may vary based on the determined presentation type. For example, referring to FIG. 11A, the metadata section 1106A provides a Form Type dropdown menu 1108A and a Name field 1110A when a Portal presentation type is selected 1104A. Referring to FIG. 11B, the metadata section 1106B provides a URL field 1112B when a Mobile presentation type is selected 1104B. Referring to FIG. 11C, the metadata section 1106C provides a URL field 1112C when a Table presentation type is selected 1104C. Referring to FIG. 11D, the metadata section 1106D provides a Name field 1110D when an Other presentation type is selected 1104D.

Figure 12:
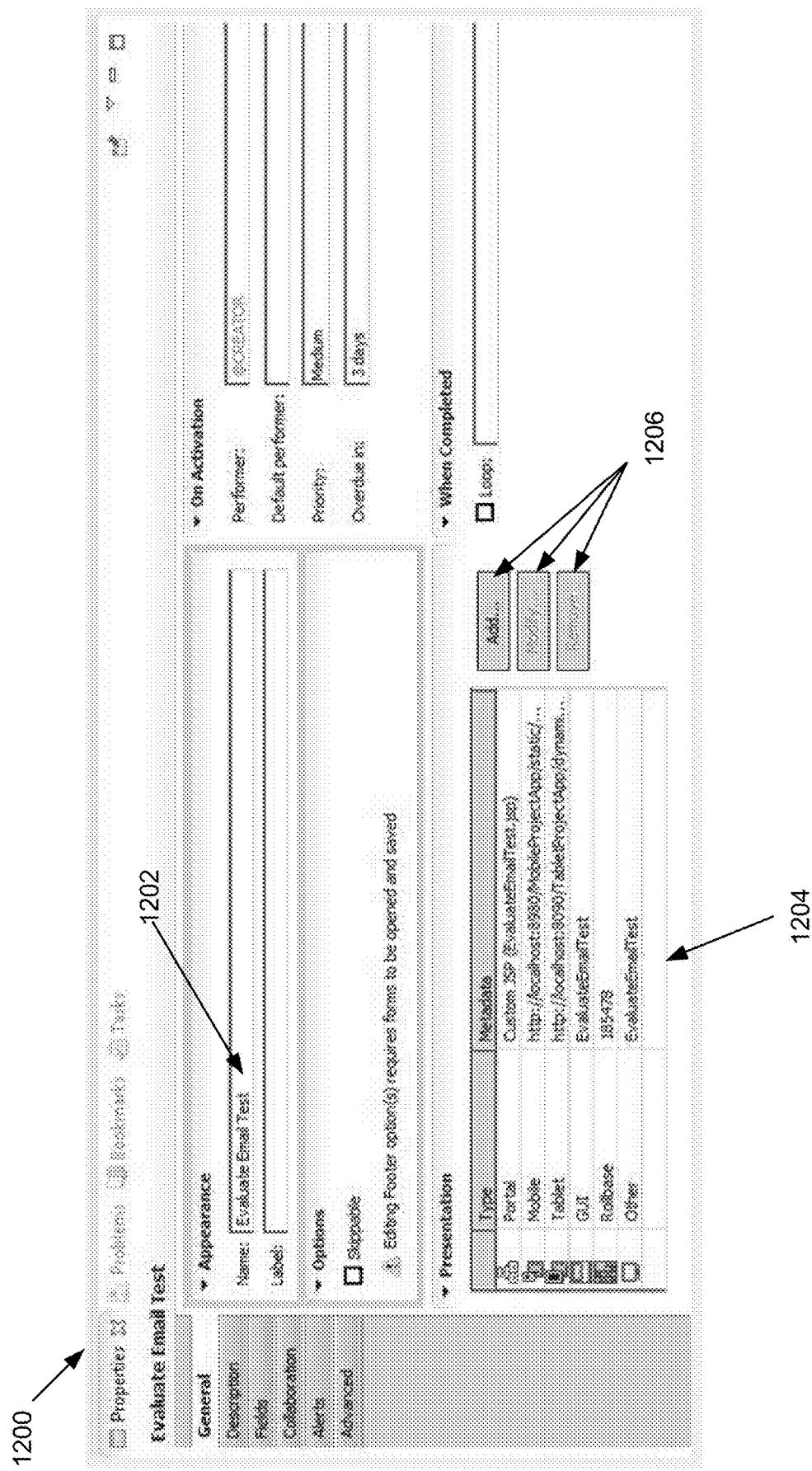
FIG. 12 is an example GUI for a human workstep presented to a developer according to one embodiment.

FIG. 12 is an example GUI 1200 for a human workstep presented to a developer according to one embodiment. In the illustrated embodiment, the UI 1200 includes a name 1202 of the human workstep, a hash table 1204 of presentation types and associated data and buttons 1206 to edit the presentation types associated with the human workstep. In one embodiment, when the "Add" button 1206 is selected by the developer a UI similar to those of FIG. 11 is displayed.

Figure 13:
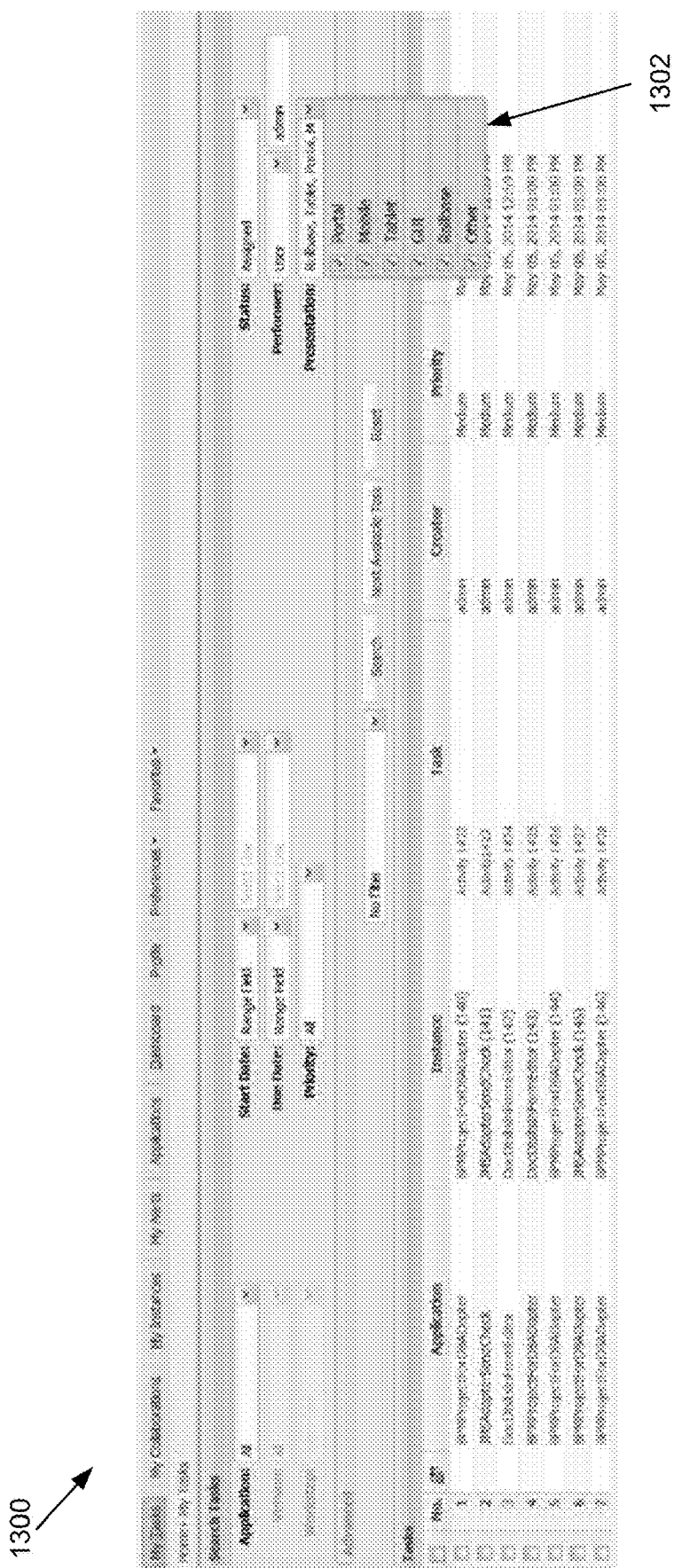
FIG. 13 is an example GUI for a portal presented to an end user according to one embodiment.

FIG. 13 is an example GUI 1300 for a portal presented to an end user according to one embodiment. In one embodiment, when an end user accesses the application, the user is able to view all the human worksteps (and instances thereof) that the user is authorized to act upon. In one embodiment, the GUI 1300 includes a dropdown menu 1302 that allows the end user to filter the human worksteps (and instances thereof) based on the presentation type(s) associated therewith. Depending on the embodiment, when multiple presentation types are selected in dropdown menu 1302, the selection may be treated as an "and" or an "or."

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    receiving, using one or more processors, a business process model for an application, the business process model including a human workstep, wherein input is received from a user to complete the human workstep;
    receiving, using the one or more processors, a plurality of presentation type-metadatum key-value pairs for association with the human workstep including a first presentation type-metadatum key-value pair and a second presentation type-metadatum key-value pair, the first presentation type-metadatum key-value pair including a first presentation type and a first metadatum, the second presentation type-metadatum key-value pair including a second presentation type and a second metadatum, wherein the second metadatum is a different metadata type from the first metadatum;
    receiving, using the one or more processors, associated user interface (UI) metadata for the plurality of presentation type-metadatum key-value pairs; and
    associating, using the one or more processors, the human workstep with the plurality of presentation type-metadatum key-value pairs.

2. The method of claim 1 comprising:
    receiving a request associated with the human workstep, the request including a requested presentation type, and
    responsive to receiving the request including a requested presentation type, sending UI metadata associated with the requested presentation type to a requesting device.

3. The method of claim 2, wherein responsive to receiving the UI metadata the requesting device renders a user interface.

4. The method of claim 2, wherein the requested presentation type corresponds to a device type of a client device.

5. The method of claim 1, wherein the first presentation type includes one of a mobile presentation type, a tablet presentation type, a portal presentation type, a form presentation type, a command line presentation type, a Java Server Page (JSP) presentation type, and a .Net presentation type.

6. The method of claim 1, wherein the received business process model includes another human workstep, the method further comprising:
    receiving another plurality of presentation type-metadatum key-value pairs for association with the another human workstep;
    receiving associated UI metadata for the another plurality of presentation type-metadatum key-value pairs; and associating the another human workstep with the another plurality of presentation type-metadatum pairs and associated UI metadata.

7. The method of claim 6, further comprising:
associating the human workstep with a first group of one or more users; and
associating the another human workstep with a second group of one or more users.

8. The method of claim 7, wherein the first group and second group include at least one common user.

9. The method of claim 7, wherein the first group and second group include no common user.

10. The method of claim 1, wherein the UI metadata includes one or more of a uniform resource identifier, a uniform resource locator, a tag, and a file location.

11. A system comprising:
a processor; and
a memory, the memory storing instructions that, when executed by the processor, cause the system to:
receive a business process model for an application, the business process model including a human workstep, wherein input is received from a user to complete the human workstep;
receive a plurality of presentation type-metadatum key-value pairs for association with the human workstep including a first presentation type-metadatum key-value pair and a second presentation type-metadatum key-value pair, the first presentation type-metadatum key-value pair including a first presentation type and a first metadatum, and the second presentation type-metadatum key-value pair including a second presentation type and a second metadatum, wherein the second metadatum is a different metadata type from the first metadatum;
receive associated user interface (UI) metadata for the plurality of presentation type-metadatum key-value pairs; and
associate the human workstep with the plurality of presentation type-metadatum key-value pairs.

12. The system of claim 11 comprising instructions that, when executed by the processor, cause the system to:
receive a request associated with the human workstep, the request including a requested presentation type, and
responsive to receiving the request including a requested presentation type, send UI metadata associated with the requested presentation type to a requesting device.

13. The system of claim 12, wherein responsive to receiving the UI metadata the requesting device renders a user interface.

14. The system of claim 12, wherein the requested presentation type corresponds to a device type of a client device.

15. The system of claim 11, wherein the first presentation type includes one of a mobile presentation type, a tablet presentation type, a portal presentation type, a form presentation type, a command line presentation type, a Java Server Page (JSP) presentation type, and a .Net presentation type.

16. The system of claim 11, wherein the received business process model includes another human workstep, the system comprising instructions that, when executed by the processor, cause the system to:
receive another plurality of presentation type-metadatum key-value pairs for association with the another human workstep;
receive associated UI metadata for the another plurality of presentation type-metadatum key-value pairs; and
associate the another human workstep with the another plurality of presentation type-metadatum key-value pairs and associated UI metadata.

17. The system of claim 16 comprising instructions that, when executed by the processor, cause the system to:
associate the human workstep with a first group of one or more users; and
associate the another human workstep with a second group of one or more users.

18. The system of claim 17, wherein the first group and second group include at least one common user.

19. The system of claim 17, wherein the first group and second group include no common user.

20. The system of claim 11, wherein the UI metadata includes one or more of a uniform resource identifier, a uniform resource locator, a tag, and a file location.

* * * * *